June 5, 1928.

A. WILLIAMS

SLIDING CLUTCH

Filed April 27, 1923

1,672,015

Inventor
Arthur Williams
By
Frank E. Liverance Jr.
Attorney.

Patented June 5, 1928.

1,672,015

UNITED STATES PATENT OFFICE.

ARTHUR WILLIAMS, OF GRAND RAPIDS, MICHIGAN, ASSIGNOR, BY MESNE ASSIGNMENTS, TO COVEL-HANCHETT CO., OF BIG RAPIDS, MICHIGAN, A CORPORATION OF MICHIGAN.

SLIDING CLUTCH.

Application filed April 27, 1923. Serial No. 635,070.

This invention relates to improvements in sliding clutches, particularly to the type known as the jaw clutch, and it pertains particularly to the specific construction of the slidable clutch member and the anti-friction mounting thereof.

Clutches of this general type are in common use and as ordinarily constructed have presented considerable difficulties in construction and operation. The clutch as usually made has its sliding member mounted to slide directly upon the shaft or upon a sleeve fastened to the shaft, and is prevented from rotating thereon by a key, generally of the type known as a feather key which projects from the shaft or sleeve into a keyway in the clutch member. In order to make a device of this character operate properly, the parts must be very carefully machined and fitted which has been an expensive operation, and unless this work is carefully done the members do not move freely, one upon the other and would stick and bind and require considerable exertion to move the clutch member.

It is the object of the present invention to overcome the structural difficulties of the old form and also to provide a very freely moving clutch member which may be shifted from one position to another with the exertion of very little energy.

The construction and operation of the device embodying this invention will be apparent from the following description and claims, reference being had to the accompanying drawings in which:

Like reference numerals refer to like parts in all of the figures.

Figure 1:
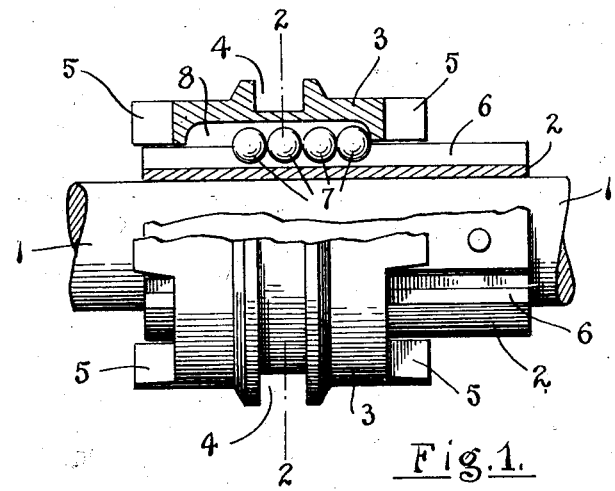
Fig. 1 is a side elevation, partly in section, of the sliding member of a clutch embodying the invention, mounted upon a sleeve which is fixed to a shaft.

1 represents a shaft upon which is fixed a sleeve 2. A sliding clutch member 3 surrounds the sleeve and is longitudinally movable thereon. The sliding member 3 is provided with an annular groove 4 to receive the actuating member (not shown) and the respective ends of the sliding member are provided with jaws 5 of conventional form which are adapted to engage corresponding jaws of the driven members which are also mounted on the shaft 1 and are not shown, these parts being common and old in the art.

The sleeve 2 is provided with a plurality of longitudinal grooves 6 preferably 3 in number equally spaced about its periphery which serve as ball races in which are located the balls 7. A plurality of concave pockets 8 corresponding in number to the grooves 6 are provided in the inner surface of the clutch member 3. When the device is assembled the balls 7 are located between the members 2 and 3, partly within the pockets 8 and partly in the grooves 6 and they serve not only as ball bearings upon which the clutch member 3 traverses when moved longitudinally of the sleeve 2, but they also act as driving members to transfer movement of the clutch member to the sleeve or vice versa.

The angles of the sides of the grooves 6 and the curvature of the surfaces of the pockets 8 are such that a nearly direct thrust is exerted by the balls which are interposed between them, and practically no wedging action occurs which would prevent an easy movement of the clutch member 3 longitudinally of the sleeve. The pockets 8 terminate near the ends of the clutch member thus retaining the balls in place after they have been properly assembled.

In order to cut the pockets 8 into the clutch member it is necessary to use a milling cutter of sufficient diameter that its cutting surface will extend radially beyond the shaft on which it is mounted and for this reason the curvature of the surface of the pockets is necessarily of a greater radius than that of the balls 7. The bottom surfaces of the pockets cut by a rotating milling cutter are necessarily arc shaped. By proper design of the clutch in substantially the proportions shown in the drawings in which the angles of the side walls of the grooves 6 and the curvature of the pockets 8 are such that their respective points of engagement with each ball are almost diametrically opposite, the thrust of these surfaces will be effective to transmit motion from one to another and will not cause an appreciable wedging action.

The grooves 6 are easily machined in the sleeve 2, this being a type of work easily done in any machine shop, requiring no great skill or time to accomplish. Since the sleeve is supported entirely upon the balls when in driving position, there need be no close fitting between the outer surface of the sleeve 2 and the inner surface of the clutch member 3, and in actual practice it has been found possible to have a space between the two members, contact being unnecessary to insure proper operation of the device. This being true the elimination of accurate work on these surfaces is made possible.

Figure 2:
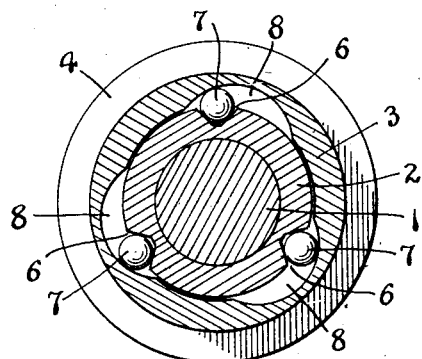
Fig. 2 is a transverse section on the line 2—2 of Fig. 1.
Figure 3:
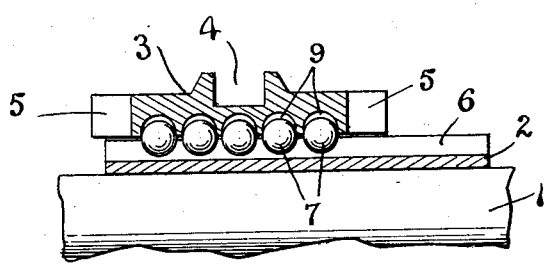
Fig. 3 is a fragmentary section showing a modification of the structure shown in Fig. 1.

In the preferred structure shown in Fig. 1 it has been found desirable to leave spaces in the pockets which are not occupied by the balls 7 to provide for the movement of the balls as the clutch member traverses the sleeve. The modified structure shown in Fig. 3, a cross section of which would be identical to that shown in Fig. 2 provides for a separate pocket 9 for each ball, otherwise the structures are identical.

I claim:

1. A sliding clutch comprising a sleeve having longitudinal grooves therein, a plurality of balls located in each of said grooves and extending beyond the periphery of the sleeve and a clutch member surrounding said sleeve and having pockets on its inner surface, said pockets corresponding in number to the grooves in the sleeve and being arc-shaped and wider circumferentially than the diameter of said balls.

2. A sliding clutch comprising a sleeve having longitudinal grooves therein, a plurality of balls located in each of said grooves and extending beyond the periphery of the sleeve and a clutch member surrounding said sleeve and having pockets on its inner surface, said pockets corresponding in number to the grooves in the sleeve and being arc-shaped and wider circumferentially than the diameter of said balls, and longer longitudinally of the sleeve than the combined diameters of the plurality of balls in each groove.

3. A sliding clutch comprising a sleeve having longitudinal grooves therein, a plurality of balls in each groove and extending beyond the periphery of said sleeve and a clutch member surrounding said sleeve and having a plurality of pockets on its inner surface, corresponding in number to said grooves and each receiving the projecting portions of the balls in the respective grooves, said pockets being arc-shaped and circumferentially wider than the diameters of said balls and deeper than the projecting portions of said balls.

4. A sliding clutch comprising a sleeve having longitudinal grooves therein, a plurality of balls in each groove and extending beyond the periphery of said sleeve and a clutch member surrounding said sleeve and having a plurality of pockets on its inner surface corresponding in number to said grooves and each receiving the projecting portions of the balls in the respective grooves, said pockets being arc-shaped and circumferentially wider than the diameters of said balls and deeper than the projecting portions of said balls, and longer longitudinally of the sleeve than the combined diameters of the balls therein.

In testimony whereof I affix my signature.

ARTHUR WILLIAMS.